(12) United States Patent
Coronado et al.

(10) Patent No.: US 9,513,998 B2
(45) Date of Patent: *Dec. 6, 2016

(54) MANAGEMENT OF MICROCODE ERRORS IN A STORAGE OPERATION

(71) Applicant: International Business Machines Corporation, Armonk, NY (US)

(72) Inventors: Juan A. Coronado, Tucson, AZ (US); Lisa R. Martinez, Escondido, CA (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/066,455

(22) Filed: Mar. 10, 2016

(65) Prior Publication Data

US 2016/0188412 A1 Jun. 30, 2016

Related U.S. Application Data (63) Continuation of application No. 14/220,218, filed on Mar. 20, 2014, now Pat. No. 9,317,357.

(51) Int. Cl.
| | |
|---|---|
| *G06F 11/18* | (2006.01) |
| *G06F 11/14* | (2006.01) |
| *G06F 11/07* | (2006.01) |
| *G06F 11/10* | (2006.01) |

(52) U.S. Cl.
CPC ......... *G06F 11/1423* (2013.01); *G06F 11/079* (2013.01); *G06F 11/0727* (2013.01); *G06F 11/0793* (2013.01); *G06F 11/1016* (2013.01); *G06F 11/1096* (2013.01); *G06F 2201/84* (2013.01)

(58) Field of Classification Search
CPC ........... G06F 11/1423; G06F 11/1016; G06F 11/1096; G06F 2201/84
See application file for complete search history.

(56) References Cited

U.S. PATENT DOCUMENTS

| | | | | |
|---|---|---|---|---|
| 5,566,298 | A * | 10/1996 | Boggs | G06F 9/268 712/E9.015 |
| 6,983,362 | B1 | 1/2006 | Kidder et al. | |
| 7,249,286 | B1 | 7/2007 | Krishnan | |
| 7,315,976 | B2 * | 1/2008 | Holt | G06F 11/1076 711/114 |
| 7,395,483 | B1 | 7/2008 | Tourancheau et al. | |
| 7,509,550 | B2 | 3/2009 | Rajski et al. | |
| 7,617,074 | B2 | 11/2009 | Beish et al. | |
| 7,657,785 | B2 * | 2/2010 | Haque | G06F 13/24 714/13 |

(Continued)

OTHER PUBLICATIONS

Coronado et al., "Management of Microcode Errors in a Storage Operation", U.S. Appl. No. 14/220,218, filed Mar. 20, 2014.

*Primary Examiner* — Esaw Abraham
(74) *Attorney, Agent, or Firm* — Stosch Sabo (57) ABSTRACT

Embodiments of the present disclosure relate to a system and computer program product for managing a microcode error in a storage operation. Embodiments include receiving an error code that corresponds to the microcode error and receiving a received error path signature for the error code. Embodiments also include identifying a metadata error path signature for the error code within a metadata table and determining whether the received error path signature for the error code substantially matches the metadata error path signature for the error code. Embodiments also include initiating a mitigation action in response to the received error path signature for the error code substantially matching the metadata error path signature for the error code.

14 Claims, 5 Drawing Sheets

(56) References Cited

U.S. PATENT DOCUMENTS

| | | | |
|---|---|---|---|
| 7,694,187 B2 * | 4/2010 | Souders | G06F 11/00 714/43 |
| 7,847,701 B2 | 12/2010 | Bajpay et al. | |
| 7,975,165 B2 * | 7/2011 | Shneorson | G06Q 10/04 714/3 |
| 8,296,605 B2 | 10/2012 | John | |
| 8,448,013 B2 | 5/2013 | Clark et al. | |
| 8,775,886 B2 | 7/2014 | Melen et al. | |
| 8,978,150 B1 * | 3/2015 | Rosen | H04L 63/1441 726/26 |
| 2007/0268905 A1 * | 11/2007 | Baker | H04L 1/0052 370/392 |

* cited by examiner

MANAGEMENT OF MICROCODE ERRORS IN A STORAGE OPERATION

CROSS-REFERENCES TO RELATED APPLICATIONS

This application is a continuation of and claims the benefit of U.S. application Ser. No. 14/220,218 filed on Mar. 20, 2014 (now U.S. Pat. No. 9,317,357).

BACKGROUND

The present disclosure relates to storage systems, and more specifically, to error analysis mechanisms.

Computer storage systems may encounter errors when reading or writing data from a storage device. When encountering errors that result in a failure, the storage device may initiate a warm start to collect information regarding the error and the pathway. During the warm start, the storage device may cease storage operations until the data is collected. The warm start data may be stored for field service personnel or transmitted to a remote location. Although warm starts may produce valuable error recovery and error analysis data, the warm start process itself may be disruptive and cause significant delays in storage operations, particularly when a storage device is frequently accessed.

SUMMARY

Embodiments of the present disclosure relate to a system and computer program product for managing a microcode error in a storage operation.

One embodiment is directed toward a system for managing a microcode error in a storage operation. The system includes one or more storage devices configured to perform the storage operation that produces the microcode error and an error code corresponding to the microcode error. The system also includes a metadata table that stores a metadata error path signature for the error code. The system also includes a storage controller configured to receive the error code and a received error path signature for the error code from the one or more storage devices. The received error path signature identifies a series of instructions executed during the storage operation that causes the storage operation to return the error code. The storage controller is configured to identify, within the metadata table, a metadata error path signature for the error code. The storage controller is configured to determine whether the received error path signature for the error code substantially matches the metadata error path signature for the error code. The storage controller is configured to initiate a mitigation action in response to the received error path signature for the error code substantially matching the metadata error path signature for the error code.

Another embodiment is directed toward a computer program product for managing a microcode error in a storage operation. The computer program product includes a computer readable storage medium having program code including computer readable program code. The program code is configured to receive an error code that corresponds to the microcode error that triggers a warm start operation issued by a storage system to collect data for problem diagnostics. The error code is a numerical representation of a type of microcode error. The program code is further configured to receive a received error path signature for the error code, where the received error path signature identifies a series of instructions executed during the storage operation that causes the storage operation to return the error code. The program code is further configured to identify a metadata error path signature for the error code within a metadata table and determine whether the received error path signature for the error code substantially matches the metadata error path signature for the error code. The program code is further configured to initiate a mitigation action in response to the received error path signature for the error code substantially matching the metadata error path signature for the error code. The mitigation action indicates an action to be taken to recover from the microcode error.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to storage systems, more particular aspects relate to error analysis mechanism. For instance, aspects of the present disclosure relate to avoiding a warm start action when a cause of a warm start has a known solution/mitigation action. The cause of the warm start is identified by a storage controller using a microcode detected error code and the error code path signature taken to produce the error code. The storage controller compares the received error code and the error path signature taken to produce the error code and compare them to an error code and error path signature taken to produce the error code on a metadata table. If there is a match, then the storage controller initiates a mitigation action in lieu of a warm start. While the present disclosure is not necessarily limited to such applications, various aspects of the disclosure may be appreciated through a discussion of various examples using this context.

Aspects of the disclosure are directed toward applications written in microcode. Microcode is a layer of hardware-level instructions or data structures involved in the implementation of higher level machine code instructions in central processing units, and in the implementation of the internal logic of many channel controllers, disk controllers, network interface controllers, network processors, graphics processing units, and other hardware. Even though microcode is used, aspects of the disclosure also apply to applications written in a lower or higher-level programming language.

Throughout the disclosure, reference to the term microcode error code is used interchangeably with the term error code. The term error path signature also refers to a microcode detected error signature path. Presently, a warm start is issued to collect data for problem diagnostics and/or for error recovery. The warm start is triggered by a microcode logic error (MLE) or microcode detected error (MDE) caused by one of the storage system components. The warm start is communicated by the use of error codes for a particular MLE or MDE. The term error code is used to refer to a numerical sequence that describes a particular MLE or MDE. The error path refers to a series of instructions taken by the storage system to produce the MLE or MDE. The error path is denoted by an error path signature which describes a code or other unique identifier that identifies the error path. The error path signature also allows a storage controller to communicate the error path in an expedient manner.

Unplanned warm starts, caused by MLEs or MDEs, impact applications that demand high performance. For example, a database application may be very sensitive to Input/Output(I/O) response times and even a short warm start may interrupt high-performance applications. Various high-performance applications of storage access involve high-frequency changes to a database where milliseconds count, e.g., high-speed financial applications. When a storage system has to sacrifice a number of seconds to perform a warm start, the high-performance application may suffer performance issues.

Warm start data that is generated as a result of the warm start is transferred to a repository, e.g., a customer solution center, over network connections that may take several hours due to the size of the information that needs to be off-loaded for analysis. Depending on customer network configurations, it may not be possible to transfer the data out of a customer environment, requiring a Customer Service Engineer to be physically at the customer environment to manually transfer the data to a flash drive and then to a repository. The repository exists, in various embodiments, in a customer solution center where skilled experts work outside of a customer environment to solve issues obtained from warm starts. The customer solution center exists at any proximity relative to the customer environment, e.g., in the same room, or across the world. This delay in obtaining data to be analyzed by the associated experts may delay understanding the error, and lead to continuing and even increasing impacts to the customer's workloads until a migration or resolution is determined.

Once the data from the warm start is collected, then the analysis of the collected data may begin at the customer solution center. The MLE or MDE that caused the warm start may be a frequent problem and fixed in subsequent patches of microcode. In the event of the problem being known, the disruption of the warm start itself and the impact of transferring the associated data may be perceived as having no value to a customer. Aspects of the disclosure may relate to determining the need for a warm start when the MLE or MDE is a known problem and has been resolved in later microcode levels.

Figure 1:
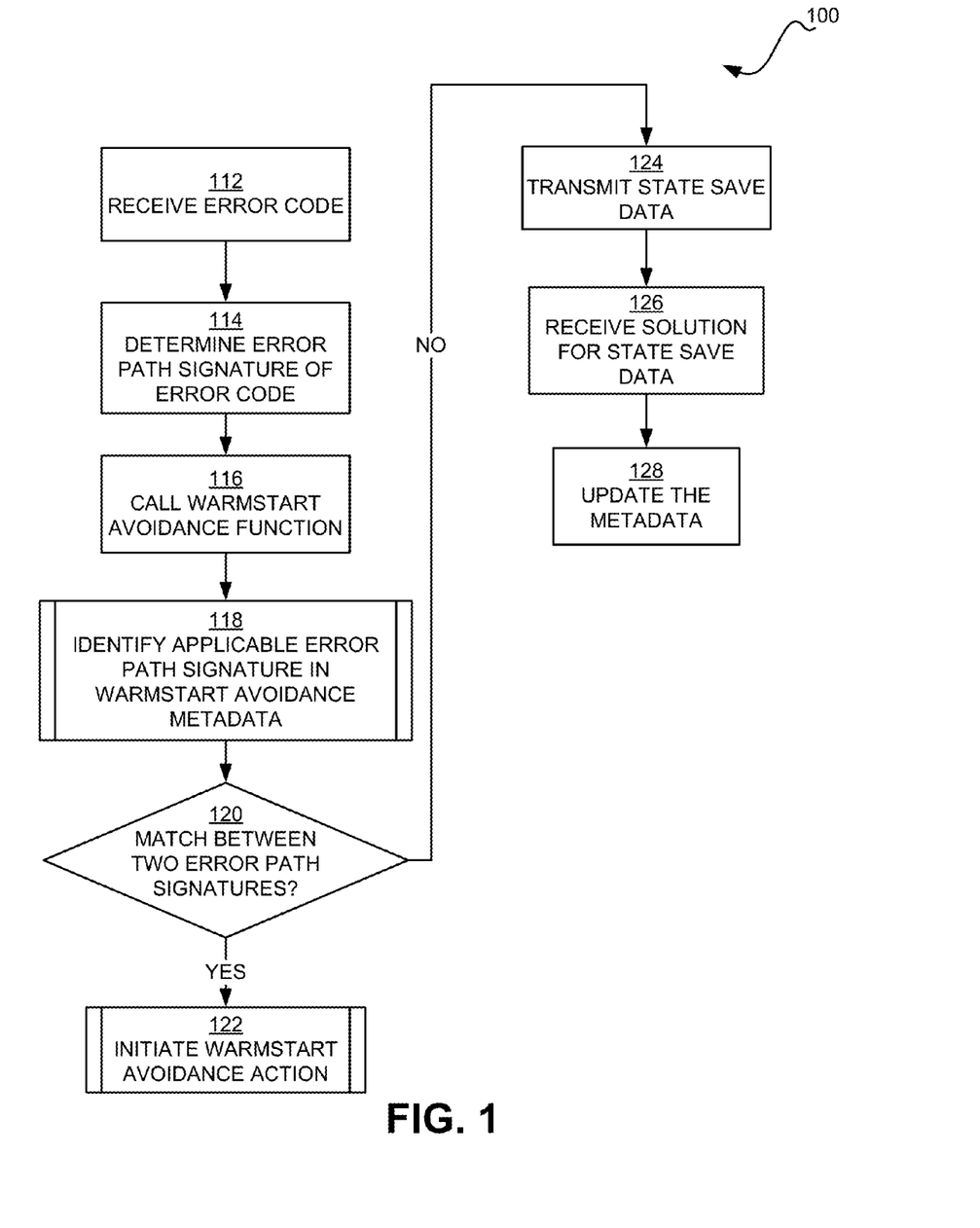
FIG. 1 illustrates a flowchart of a method 100 of managing a warm start avoidance function, according to various embodiments.

FIG. 1 illustrates a flowchart of a method 100 of managing a warm start avoidance function, according to various embodiments. The method 100 involves comparing two error path signatures, one error path signature from a warm start avoidance metadata and another error path signature from a storage system, and if there is a match between the two error path signatures, then warm start avoidance function occurs and the warm start is avoided. Each error code produced by a storage device has a specific error path signature, with an error code and error path signature associated with the error code. The method 100 begins at operation 112.

In operation 112, the storage controller receives an error code. The error code originates from the microcode error on a storage device in a storage system, according to various embodiments. The error code is a numerical representation of the type of microcode error that occurred. For example, in an IBM™ TS7700™ system, the MDE code of 8101 may correspond to vtd_cache_check: Cache subsystem detected an error. The MDE and MLE is dependent on the type of storage device used. The error code is the same as a new error. Once the error code is received by the storage controller, the method 100 continues to operation 114.

In operation 114, the storage controller determines the error path signature of the error code. The error path signature is a particular numerical or alpha-numeric code that indicates the circumstances that created the error code. For example, a storage device produces an error path signature number of "101" when data is read from a read head and an error path signature number of "140" when the data is stored in a cache. The error path signature numbers are associated with an error code.

In various embodiments, the storage controller references a code path table to assign the error path signature number of an error code. For example, the code path table is accessed whenever a data is written into cache and produces an error code. The storage controller determines, from the code path table, that the pathway data written into a cache corresponds to an error path signature number of "140". Various components of the storage controller are responsible for operations 112, and 114. For example, a monitoring module of the storage controller monitors for the error code in the storage device in operation 112. The monitoring module may also maintain the code path table.

In various embodiments, the error path signature may be stored temporarily in a signature path structure. During code execution, as each storage function is called, the storage function saves its unique number in a signature path structure. The signature path structure may also be saved within the warm start avoidance metadata. Once the storage controller determines the error path signature of the error code, then the method 100 continues to operation 116.

In operation 116, the storage controller calls the warm start avoidance function to determine if the MDE or MLE corresponding to the error code has been fixed in a higher release level of microcode. The warm start avoidance function is a subroutine of the storage controller to avoid the warm start if a solution to the warm start already exists, according to various embodiments. The warm start avoidance function may be a subroutine of the storage controller. According to various embodiments, the warm start avoidance function may block the warm start. In various embodiments, the warm start avoidance function is always activated instead of optional. Once the warm start avoidance function is called, then the method 100 may continue to operation 118.

In operation 118, the warm start avoidance function identifies the applicable error path signature in the warm start avoidance metadata. According to various embodiments, the warm start avoidance metadata (WAM) is a repository of the various error codes with known mitigation actions. The WAM may also be referred to as a mitigation action database. The warm start avoidance function will search the warm start avoidance metadata for the error code corresponding to the MLE or MDE entry. In various embodiments, the error code in the WAM is referred to as a rectified error since entries in the WAM may refer to errors with solution. As each entry for the specified error code is found, the warm start avoidance function will compare the error path signature received against the signature entered in the warm start avoidance metadata for that error code. The number of entries to be compared and which make the error path signature unique is used as the number of error path signature numbers to compare. During operation 118, the warm start avoidance function determines if the error code and error path signature received from the storage controller are in the metadata. Once the storage controller identifies the applicable signature path, then the method 100 continues to operation 120.

In operation 120, the warm start avoidance function determines whether the received error path signature substantially matches the metadata error path signature for the error code. In various embodiments, the received error path signature is an associated signature of a new error while the metadata error path signature is the associated signature of a rectified error. An error path signature substantially matches when a majority of elements matches. For example, the error path signatures substantially match whenever both at least two error path signatures out of five error path signatures for the error codes match. The error codes must also be sufficiently similar to trigger a match. For example, if the received error code is for a cache write error that is solved by the same update as the metadata error code from the received error code for a cache read error, then the error codes may be considered substantially similar. If the error path signatures substantially match, then the method 100 continues to operation 122. If the error path signatures do substantially match, then the method 100 continues to operation 124.

In operation 122, the storage controller initiates a warm start avoidance action. According to various embodiments, the warm start avoidance action is a series of instructions for the storage system to avoid the warm start. The warm start avoidance action involves searching the metadata for a mitigation action and implements the mitigation action.

The mitigation action indicates the action to be taken to recover from the MLE or MDE. A mitigation action is defined by the administrator or service team that had analyzed the MLE or MDE and had provided the fix along with the steps to mitigation from the MLE or MDE. The mitigation action is an external or internal event. An external event may be a host sending a reset for the input/output that has failed. An internal event may take place in a control unit. For example, the internal event may consist of rediscovering and rebuilding a linked list, not fencing a resource that would normally be fenced, only fencing one resource but not every resource of a particular type. An internal event is also a reduced operation warm start where there is not a need to collect and analyze data.

In operation 124, the storage controller transmits the state save data for the error code. As part of the transmitting, the storage controller also collects the state save data. The state save data is data from a saved state of the storage device. In various embodiments, a warm start operation for the error code may initiate the state save data collection. For example, the warm start stops the storage operation within the storage device to collect the state save data regarding the error code. The warm start operation occurs in a similar manner to other warm start operations that are found in the IBM™ DS8000™ system or other storage systems. In various embodiments, the state save data of the error code is collected into a cache or other repository, e.g., a Compact Disk, Flash Drive and transmitted manually. In various embodiments, the state save data may be transmitted via a network connection. After the storage controller transmits the state save data, then the method 100 continues to operation 126.

In operation 126, the storage controller receives a solution for the error code from the state save data. The solution includes a mitigation action, according to various embodiments. The mitigation action is found independent from the storage system, e.g., a customer solution facility, according to various embodiments. The mitigation action is found at any period of time after the state save data is transmitted, e.g., three weeks, and after any level of analysis. After the solution is received, then the method 100 continues to operation 128.

In operation 128, the storage controller updates the metadata with the solution. In various embodiments, the solution is packaged and installed into the metadata on the control unit. For example, a given error code with an error path signature receives a mitigation action of upgrade to the current microcode level. Thus, the solution of upgrade is written to the metadata for use in future operations.

In various embodiments, the metadata exists in a metadata table. Updates to the metadata involve locating the error code and error path signature of the metadata, associating the solution to the error code and error path signature, and uploading the mitigation action to the metadata. In various embodiments, the signature path structure is translated to the warm start avoidance metadata. The translation could be done manually by entering in the error path signature numbers in warm start avoidance metadata in a newly created element of warm start avoidance metadata. The translation could also update a warm start avoidance metadata entry that has been assigned for the MLE or MDE.

The metadata is updated when an update is received from the customer solution center. When the warm start data is sent to the customer solution center, the mitigation action to the error code at the error path signature is not yet known. Once the customer solution center determines the mitigation action, the customer solution center updates the storage controller with the mitigation action. The storage controller determines which column and row of the metadata to place the associated mitigation action.

In various embodiments, the warm start avoidance metadata in the storage controller is updated with the information related to the MLE or MDE. Since warm start avoidance metadata along with the supporting code was initially part of a code release, future updates to warm start avoidance metadata in the storage controller may be updated independently to the actual level of code on the control unit. The update is made without disruption. To accomplish the update, the warm start avoidance metadata is updated with new entries through the Storage Controller User Interface such as a new IBM™ System Storage DS Command Line Interface (DSCLI) command. Once warm start avoidance metadata is updated in the storage controller memory, a copy of updated warm start avoidance metadata is saved in the storage controller internal disk drives. Whenever an event occurs that causes an initial microcode load (IML) of a single central electronic complex (CEC) of both CEC's, warm start avoidance metadata is loaded to the storage controller memory as part of the CEC IML.

Figure 2:
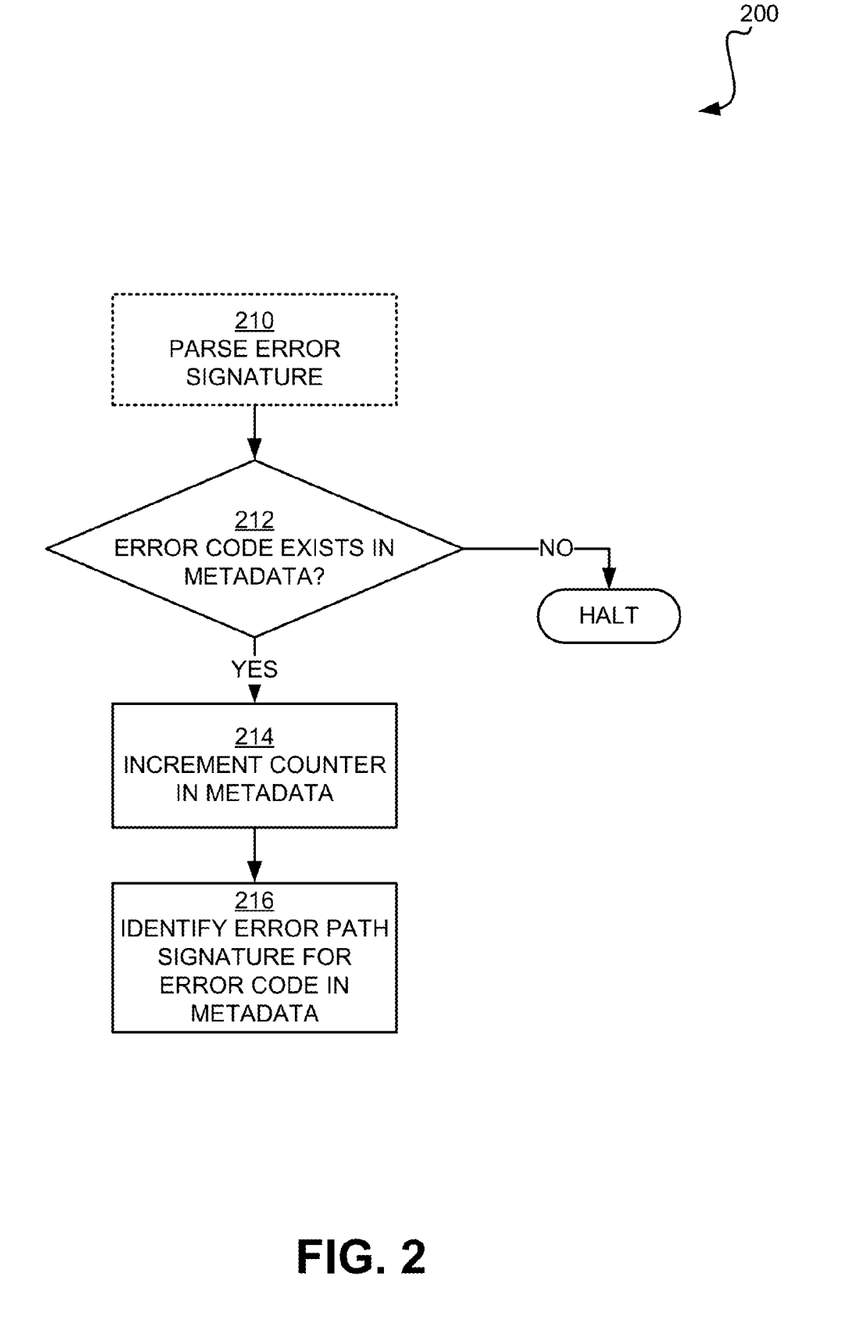
FIG. 2 illustrates a flowchart of a method 200 of identifying the applicable error code in the warm start avoidance metadata, according to various embodiments.

FIG. 2 illustrates a flowchart of a method 200 of identifying the applicable error code in the warm start avoidance metadata, according to various embodiments. The method 200 corresponds to operation 118 in FIG. 1. The method 200 involves locating the error code and the corresponding error path signature in the metadata. Aspects of the method 200 are performed by the warm start avoidance function in the storage controller. In various embodiments, the monitoring module passes an error code to the warm start avoidance function of the storage controller. The method 200 begins at operation 210.

Operation 210 is optional depending on whether an error signature, that includes an error code and an error path signature, is received by the storage controller. In various embodiments, the error signature is recognized as an error path signature for an error code. In operation 210, the storage controller may parse the error signature received as part of a prior operation, e.g., operation 112 from FIG. 1. The parsing may occur by receiving the entire error signature and storing the error signature in a cache. The error signature may be parsed by isolating the signal that corresponds to the error code and the corresponding error path signature. Once the storage controller parses the error signature, then the method 200 may continue to operation 212.

In operation 212, the storage controller determines whether the error code that corresponds to the parsed error signature in operation 210 exists in the metadata. In various embodiments, the error code can be a first instance and therefore not observed before. If the error code does not exist in the metadata table, then the method 200 halts. If the error code exists in the metadata table, then the method 200 continues to operation 214.

In operation 214, the storage controller increments the counter within the metadata that corresponds to the error code. For example, when the error code is received, then the metadata table may increment, by one, an entry in the metadata table that corresponds to the error code. The incrementing serves as a log to determine how many times a particular error code occurs. The incrementing occurs independent from the recording of the error path signature.

In various embodiments, the warm start avoidance metadata contains a count element that keeps the number of times the MLE or MDE occurs at the current microcode level. The count element may be used later by the warm start avoidance function to tell a user the number of occurrences of the same MLE or MDE. The user may use this information to make a decision. For instance, the user may determine when to update to the level of microcode that contains a fix because the count has reached a user-defined threshold, e.g., a counter threshold. The counter threshold is a threshold for the number of times an MLE or MDE appears in the storage system. Once the counter threshold is surpassed, then the storage controller may be automatically triggered to update to the most recent version of microcode/microcode level. The most recent microcode level may have the fix for the MLE or MDE. Once the storage controller increments the counter, then the method 200 continues to operation 216.

In operation 216, the storage controller identifies the error path signature that corresponds to the error code in the metadata. The error path signature may be associated with the error code in the parsing of operation 210. Once the error code is located within the metadata, the error path signature of the error code is located in the metadata.

Figure 3:
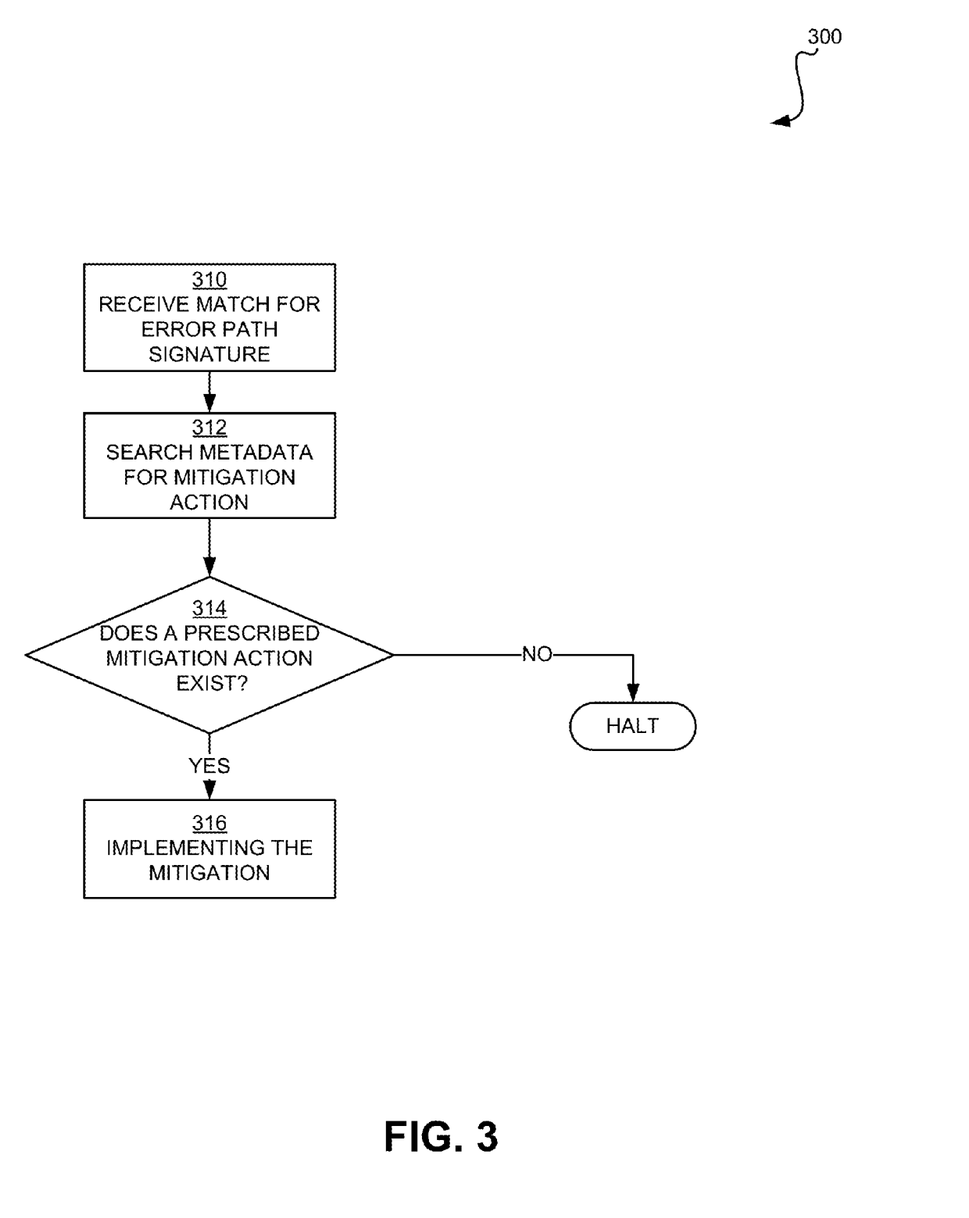
FIG. 3 illustrates a method 300 of implementing a warm start avoidance action, according to various embodiments.

FIG. 3 illustrates a method 300 of implementing a warm start avoidance action, according to various embodiments. The method 300 corresponds to operation 122 in FIG. 1. The warm start avoidance function may search the metadata for a mitigation action and if a mitigation action exists, then the warm start avoidance function implements the mitigation action. The method 300 begins at operation 310.

In operation 310, the warm start avoidance function of the storage controller receives a match signal for the error path signature in the metadata table and the received error path signature from the storage operation. According to various embodiments, the error path signature match corresponds to operation 120 in FIG. 1. Once a match signal is received by the warm start avoidance function, then the method 300 continues to operation 312.

In operation 312, the warm start avoidance function searches the metadata for a mitigation action to the error code. The warm start avoidance function searches the metadata table, according to various embodiments. The metadata table contains a reference to the mitigation action associated with the error code and the error path signature. Once the mitigation action is found, then the method 300 continues to operation 314.

In operation 314, the warm start avoidance function determines whether a prescribed mitigation action exists for the error path signature at the error code. If there is no mitigation action, i.e. the non-existence of a mitigation action, the method 300 halts. In various embodiments, if there is not a mitigation action for the error path signature, the warm start avoidance function waits for a mitigation action to be found. For instance, the mitigation action may be found at a customer solution center. If there is no mitigation action, then the storage controller avoids the warm start because a warm start to a known problem will not be beneficial to the storage system. The warm start avoidance function may increment a counter for the error code for a reoccurring MDE or MLE. In various embodiments, a matching error path signature at the error code necessarily indicates that the mitigation action exists at the error code.

If there is a mitigation action, i.e., an existence of a mitigation action, then the warm start avoidance function implements the mitigation action in operation 316. For example, if the mitigation action is to update the microcode level, then the storage controller updates the microcode level. Other possible mitigation actions would depend on the specific error code but may include reconfiguring the data processing pathways or holding data for a longer period of time.

Figure 4:
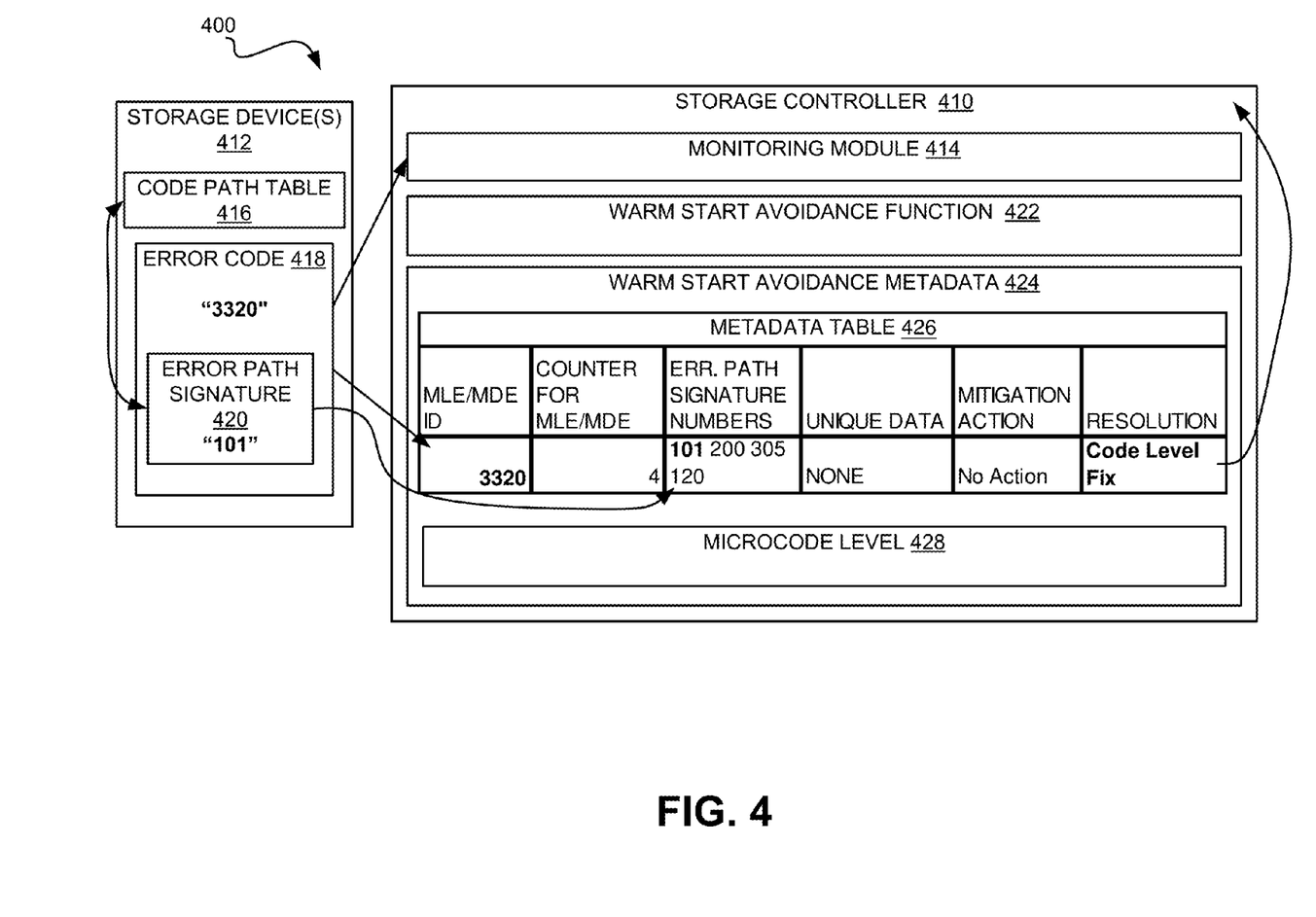
FIG. 4 illustrates a block diagram of a storage system 400 configured to avoid warm starts, according to various embodiments.

FIG. 4 illustrates a block diagram of a storage system 400 configured to avoid warm starts, according to various embodiments. The storage system 400 has a storage control 410 that controls data storage between one or more storage devices 412. The storage system 400 has a monitoring module 414. The monitoring module 414 is configured to monitor a storage device 412 for an error, e.g., an error code 418 referring to an MLE or MDE, that would prompt a warm start.

Once the error code 418 is received by the monitoring module 414, the storage controller 410 forwards the error code 418 to the warm start avoidance function 422. The warm start avoidance function 422 is configured to receive the error code 418 and determine if a warm start can be avoided by the storage system 100.

An error path signature 420 may be associated with the error code 418. In various embodiments, a code path table 416 is used to relate the code path that is taken by the storage device 412 to the error code 418. For example, the code path table 416 relates the storage actions on the storage device 412 to an error path signature 420. The code path table 416 may be maintained by the monitoring module 414. Although the code path table 416 is shown as part of the storage device 412, it is understood that the code path table 416 exists anywhere in the storage system 400.

To determine if the warm start may be avoided, the warm start avoidance function 420 accesses the warm start avoidance metadata 424. The warm start avoidance metadata 424 includes a metadata table 426 and a microcode level 428. Both the metadata table 426 and the microcode level 428 may exist independently or be incorporated into the warm start avoidance metadata 424. In various embodiments, the metadata table 426 is the warm start avoidance metadata 424 and the microcode level 428 is specified in the metadata table 426. The metadata table 426 also specifies a counter for the MLE/ MDE ID, i.e., the error code. The metadata table 426 also specifies the resolution taken for the mitigation action. In this example, there is no mitigation action specified so the resolution is a code level fix.

The microcode level 428 specifies the latest microcode level that was last updated from a customer solution center. In various embodiments, the microcode level 428 specifies a minimum microcode level required by the warm start avoidance function 422. For example, the warm start avoidance function may specify the microcode level of 9.0.1 release 2 for the storage system. If the current microcode level in the storage system 400 is 9.0.1 release 3, then any mitigation actions involving an update of the microcode level would have been solved or otherwise the update is not sufficient. Likewise, if the current microcode level in the storage system 400 is 9.0.1 release 1, then updating the microcode level may be sufficient as a mitigation action.

The warm start avoidance function 422 receives the error code 418 and the error path signature 420 of the error code 418. In this example, the error code 418 has a code of "3320" and the error path signature 420 has a code of "101". The warm start avoidance function 422 references the error code "3320" in the metadata table 426. Once the error code 3320 is located in the metadata table 426, then the warm start avoidance function 422 also determines whether the error code "3320" also has an error path signature "101". In this example, the error path signature "101" is one of many error path signature numbers for error code "3320". For example, error code "3320" has error path signature numbers of "101, 200, 305, or 120". A mitigation action would apply for an error code match with any of the error path signature numbers. Thus, an error path signature match with any error path signature listed in the metadata table 426 for an error code is a match.

An error path signature number may also refer to different portions in a path taken to obtain an error code. In various embodiments, each error path signature number in the metadata table 426 may also correspond to a particular route that caused the error code. For example, error path signature "101" corresponds to one portion of the path, error path signature "200" corresponds to another portion of the path, etc. Thus, the presence of error path signature "101" in "101, 200, 305, and 120" would not necessarily match the error code "3320" and the mitigation action for "3320" would not necessary apply. Whether the error path signature numbers are required to all match or partly match is determined by the warm start avoidance function 422 policy.

Assuming that the received error path signature 420 matches, the warm start avoidance function 422 searches the metadata table 426 for the mitigation action. The mitigation action in this example is to perform a code level fix. To initiate a code level fix, the storage controller updates the microcode level 428.

Figure 5:
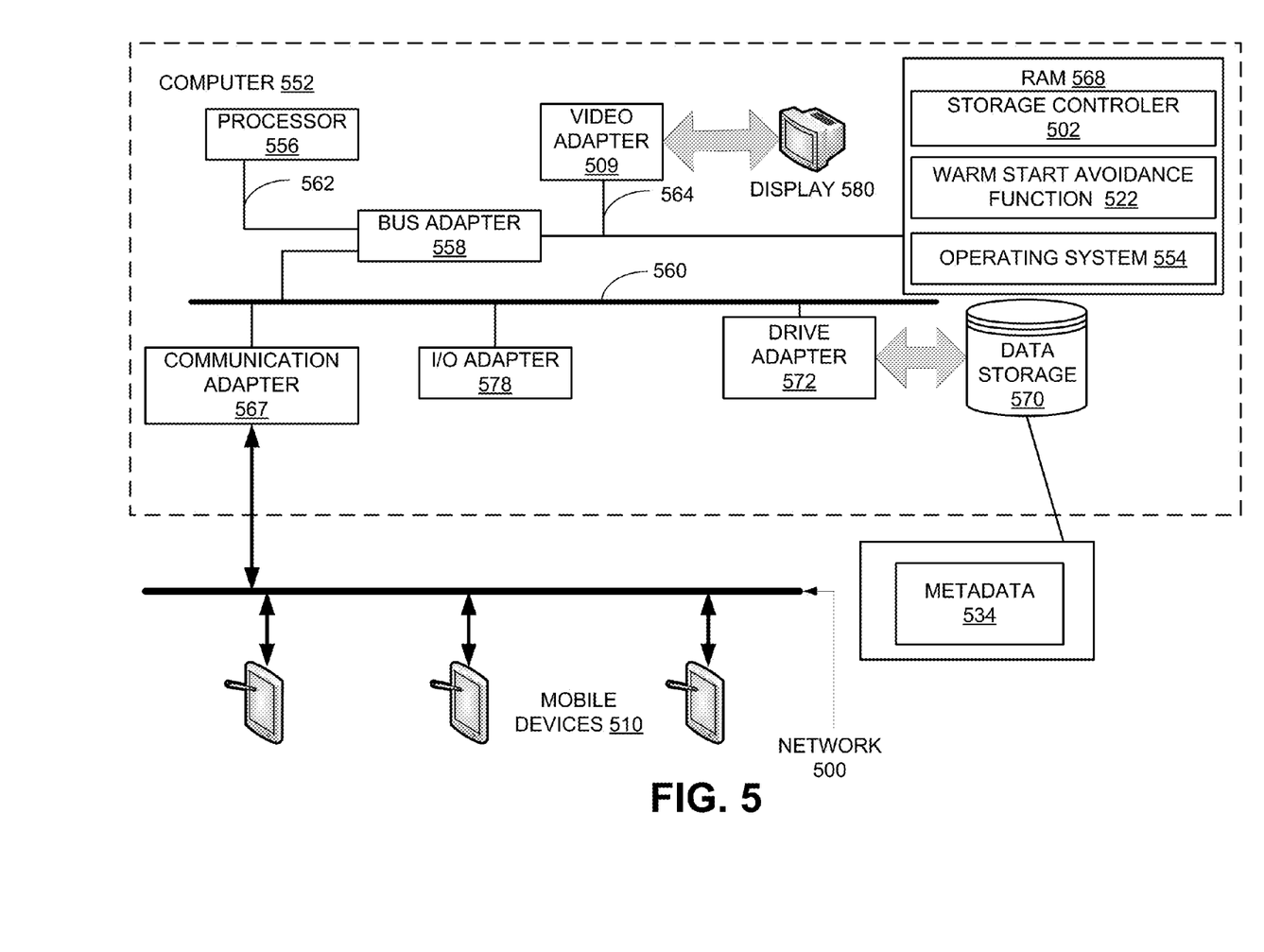
FIG. 5 illustrates a block diagram of automated computing machinery, according to various embodiments.

FIG. 5 illustrates a block diagram of automated computing machinery, according to various embodiments. The computing machinery may include example computer 552 useful in performing aspects of the disclosure, according to various embodiments. The computer 552 of FIG. 5 includes at least one computer processor 556 or 'CPU' as well as random access memory 568 ('RAM') which is connected through bus adapter 558 to processor 556 and to other components of the computer 552.

The RAM 568 may include a storage controller 502. The storage controller 502 controls the flow of data within one or more data storage devices, e.g., 570. The storage controller 502 monitors for an error code and an error path signature. The storage controller 502 has a warm start avoidance function 522 that exists as a part of the storage controller 502 or as a separate module. Once the error signature is detected, the warm start avoidance function 522 determines if the received error path signature matches an error path signature in a metadata 534. If there is a match, then the warm start avoidance function 522 implements the mitigation action instead of performing a warm start. The RAM 568 may include an operating system 554. Operating systems useful for record filtering according to embodiments of the present invention include UNIX®, Linux®, Microsoft XP™, AIX®, IBM's i5/OS™, and others. The operating system 554 are shown in RAM (568), but many components of such software typically are stored in non-volatile memory also, such as, for example, on a disk drive 570.

The computer 552 may also include disk drive adapter 572 coupled through expansion bus 560 and bus adapter 558 to processor 556 and other components of the computer 552. Disk drive adapter 572 connects non-volatile data storage to the computer 552 in the form of disk drive 570. Disk drive adapters useful in computers include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The data storage 570 may include one or more storage devices in a tiered or non-tiered configuration. The data storage 500 may be configured to store metadata 534 that is accessed by the warm start avoidance function 522. The metadata 534 stores the information regarding previous error codes. The metadata 534 also contains the mitigation actions to solve the error path signature for the error code.

The example computer 552 includes one or more input/ output ('I/O') adapters 578. I/O adapters implement user-oriented input/output through, for example, software drivers and computer hardware for controlling output to display devices such as computer display screens, as well as user input from user input devices 581 such as keyboards and mice. The example computer 552 includes a video adapter 509, which is an example of an I/O adapter specially designed for graphic output to a display device 580 such as a display screen or computer monitor. Video adapter 509 is connected to processor 556 through a high speed video bus 564, bus adapter 558, and the front side bus 562, which is also a high speed bus.

The example computer 552 includes a communications adapter 567 for data communications with other computers 510, e.g., mobile devices, and for data communications with a data communications network 500. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for managing a microcode error in a storage operation comprising:
   one or more storage devices configured to perform the storage operation that produces the microcode error that triggers a warm start operation issued by a storage system to collect data for problem diagnostics, and an error code corresponding to the microcode error, wherein the error code is a numerical representation of a type of microcode error;
   a metadata table that stores a metadata error path signature for the error code;
   a storage controller configured to:
      receive the error code and a received error path signature for the error code from the one or more storage devices, wherein the received error path signature identifies a series of instructions executed during the storage operation that causes the storage operation to return the error code;
      identify, within the metadata table, the metadata error path signature for the error code;
      determine whether the received error path signature for the error code substantially matches the metadata error path signature for the error code; and
      initiate a mitigation action in response to the received error path signature for the error code substantially matching the metadata error path signature for the error code, the mitigation action indicates an action to be taken to recover from the microcode error.

2. The system of claim 1, wherein the metadata error path signature is a particular alpha-numeric code that indicates circumstances that created the error code.

3. The system of claim 1, wherein the mitigation action includes reconfiguring data processing pathways of the storage system.

4. The system of claim 1, wherein the mitigation action includes holding data for a longer period of time.

5. A computer program product for managing a microcode error in a storage operation, the computer program product comprising a computer readable storage medium having program code embodied therewith, the program code comprising computer readable program code configured to:
   receive an error code that corresponds to the microcode error that triggers a warm start operation issued by a storage system to collect data for problem diagnostics, wherein the error code is a numerical representation of a type of microcode error;
   receive a received error path signature for the error code, wherein the received error path signature identifies a series of instructions executed during the storage operation that causes the storage operation to return the error code;
   identify a metadata error path signature for the error code within a metadata table;
   determine whether the received error path signature for the error code substantially matches the metadata error path signature for the error code; and
   initiate a mitigation action in response to the received error path signature for the error code substantially matching the metadata error path signature for the error code, the mitigation action indicates an action to be taken to recover from the microcode error.

6. The computer program product of claim 5, wherein to identify the metadata error path signature the program code is further configured to:
   match the error code to a respective instance in the metadata table; and
   retrieve, from the respective instance in the metadata table, the metadata error path signature corresponding to the error code.

7. The computer program product of claim 5, wherein the program code is further configured to:
   update a respective instance of the metadata table in response to receiving the error code, wherein the updating comprises cataloguing an occurrence of the error code.

8. The computer program product of claim 7, wherein the program code is further configured to:
   modify a microcode level in response to cataloguing, in the metadata table, a number of occurrences of the error code within an occurrence threshold.

9. The computer program product of claim 5, wherein to initiate the mitigation action the program code is further configured to:
   determine whether the mitigation action exists in the metadata table; and
   initiate the warm start operation in response to a non-existence of the mitigation action.

10. The computer program product of claim 9, wherein to determine whether the mitigation action exists in the metadata table the program code is further configured to:
    determine whether the mitigation action includes a microcode level;
    determine whether a current microcode level is outside the microcode level; and
    update the microcode level in response to the current microcode level being outside the microcode level.

11. The computer program product of claim 5, wherein the program code is further configured to:
    receive the mitigation action for the metadata error path signature;

update the metadata table with the mitigation action for the metadata error path signature.

12. The computer program product of claim 5, wherein the metadata error path signature is a particular alphanumeric code that indicates circumstances that created the error code.

13. The computer program product of claim 5, wherein the mitigation action includes reconfiguring data processing pathways of the storage system.

14. The computer program product of claim 5, wherein the mitigation action includes holding data for a longer period of time.

* * * * *